US008674944B2

(12) United States Patent
Bells et al.

(10) Patent No.: US 8,674,944 B2
(45) Date of Patent: Mar. 18, 2014

(54) METHOD AND HANDHELD ELECTRONIC DEVICE FOR IMPROVED CALENDAR USER INTERFACE NAVIGATION

(75) Inventors: Matthew Bells, Waterloo (CA); Darrell May, Waterloo (CA)

(73) Assignee: Blackberry Limited, Waterloo (CA)

( * ) Notice: Subject to any disclaimer, the term of this patent is extended or adjusted under 35 U.S.C. 154(b) by 1263 days.

(21) Appl. No.: 11/850,964

(22) Filed: Sep. 6, 2007

(65) Prior Publication Data

US 2009/0066650 A1    Mar. 12, 2009

(51) Int. Cl.
*G06F 3/041* (2006.01)

(52) U.S. Cl.
USPC .............. 345/173; 178/18.01; 178/19.01; 345/157; 715/764

(58) Field of Classification Search
USPC .......... 345/167, 157, 160, 173–178, 156, 345/158–159; 178/18.01–19.07; 715/700–866
See application file for complete search history.

(56) References Cited

U.S. PATENT DOCUMENTS

| 6,232,970 | B1 * | 5/2001 | Bodnar et al. | 715/708 |
| 6,433,776 | B1 | 8/2002 | Todd | |
| 6,966,037 | B2 | 11/2005 | Fredriksson et al. | |
| 7,499,040 | B2 * | 3/2009 | Zadesky et al. | 345/204 |
| 7,626,573 | B2 * | 12/2009 | Lee et al. | 345/167 |
| 2006/0181517 | A1 * | 8/2006 | Zadesky et al. | 345/173 |
| 2006/0250377 | A1 * | 11/2006 | Zadesky et al. | 345/173 |
| 2007/0192737 | A1 | 8/2007 | Lee | |
| 2008/0007528 | A1 | 1/2008 | Lee et al. | |

OTHER PUBLICATIONS

User Guide: BlackBerry 6230 Wireless Handheld and BlackBerry 6280 Wireless Handheld; Last modified on Sep. 3, 2003, pp. 87-98; published in Canada.

* cited by examiner

*Primary Examiner* — Michael Pervan
(74) *Attorney, Agent, or Firm* — Ridout & Maybee LLP

(57) ABSTRACT

A method, handheld electronic device and computer program product for inputting calendar information using a graphical user interface (GUI) of a calendar application are provided. The GUI is displayed on a display screen of the handheld electronic device which comprises a navigational input device for receiving navigational input in a first and a second direction. The method comprises: displaying a calendar event user interface screen on the display screen of the handheld electronic device, the calendar event user interface screen comprising a primary field having at least two subfields; invoking an edit mode of the primary field in response to predetermined user selection input; redisplaying the calendar event user interface screen to provide a visual indication that the edit mode is currently invoked for the primary field; changing the logical value of a selected subfield in response to navigational input in the first direction and redisplaying the changed value of the selected subfield in the calendar event user interface screen; and selecting an adjacent subfield in response to navigational input in the second direction and redisplaying the adjacent subfield to provide a visual indication that the adjacent subfield is the selected subfield in the calendar event user interface screen.

21 Claims, 7 Drawing Sheets

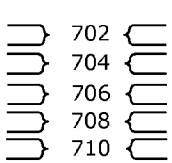
FIG. 8A FIG. 8B
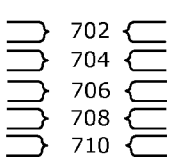
FIG. 8C FIG. 8D
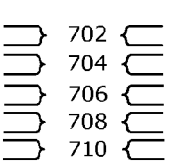
FIG. 8E FIG. 8F

METHOD AND HANDHELD ELECTRONIC DEVICE FOR IMPROVED CALENDAR USER INTERFACE NAVIGATION

TECHNICAL FIELD

The present application relates to mobile electronic devices, and more particularly to a method and handheld electronic device for improved calendar user interface navigation.

BACKGROUND

Mobile electronic devices, in particular handheld devices, are sometimes equipped with a scroll wheel which allows the device user to scroll between selectable fields. However, scroll wheels provide only one dimension (1D) of directional input which requires the user to sequentially cycle through each field to navigate to a desired field. This creates a navigation system which can be time consuming, and which can be complicated and difficult to use for some users. These problems are exacerbated when navigating through large columns or tables of selectable fields.

A common application of handheld electronic devices which have columns or tables of selectable fields is a system or application for scheduling events such as, for example, a built-in calendar. If the system or application does not permit the device user to enter event details in an intuitive manner, benefits realized through the use of the system or application may be less than if it did permit event details to be entered in such a manner.

Thus, there exists a need for a method and mobile electronic device having improved navigation of a calendar application user interface and improved entry of calendar event details.

BRIEF DESCRIPTION OF THE DRAWINGS

FIGS. 8A to 8J are example screen captures of a new calendar entry user interface screen of a calendar application run on the mobile electronic device in accordance with one example embodiment which illustrate the entry of event details.

Similar or the same reference numerals are used in different Figures to denote similar components.

DETAILED DESCRIPTION OF EXAMPLE EMBODIMENTS

The present application describes a method and mobile electronic device (such as a handheld electronic device) for two-dimensional calendar navigation which seeks to provide improved display and navigation of fields, such as event start and end details, particularly within a calendar entry (appointment) view of a graphical user interface (GUI) of a calendar application. Using a clickable or depressible trackball, a user of the mobile electronic device may navigate to a desired field in the calendar entry view by moving a selection icon or cursor (also known as the "focus") to the field's location in the calendar entry view. The user can move the focus by moving (i.e., rolling or rotating) the trackball in the appropriate direction until the desired field is selected. The focus will typically highlight or otherwise change the appearance of the field to provide the user with a visual indication of which field is currently selected. The trackball provides two dimensions of directional input to the mobile electronic device comprising: an up/down directional input relative to the display screen of the mobile electronic device, and a left/right directional input relative to the display screen of the mobile electronic device. At least some fields have an edit mode which, once the field is selected by the focus, may be launched or invoked by clicking or depressing the trackball.

In some embodiments, within the edit mode the user may roll the trackball up or down to increase or decrease the respective value of the field or advance/reverse between options within a predefined list of options, for example, within a popup or dropdown list. If the field comprises two or more subfields (such as the start or end fields, for example), the user may also roll the trackball left/right to move between subfields in the calendar entry view.

The present description of example embodiments does not limit implementation to any particular computer programming language or system architecture. Embodiments described in the specification are not limited to any particular operating system (OS), mobile electronic device architecture, server architecture, or computer programming language. Any references herein to "messages" are not intended to be limited to email, but should be understood to include other types of electronic messages that one ordinarily skilled in the art would understand to be possible in the context in which the term is used.

Figure 1:
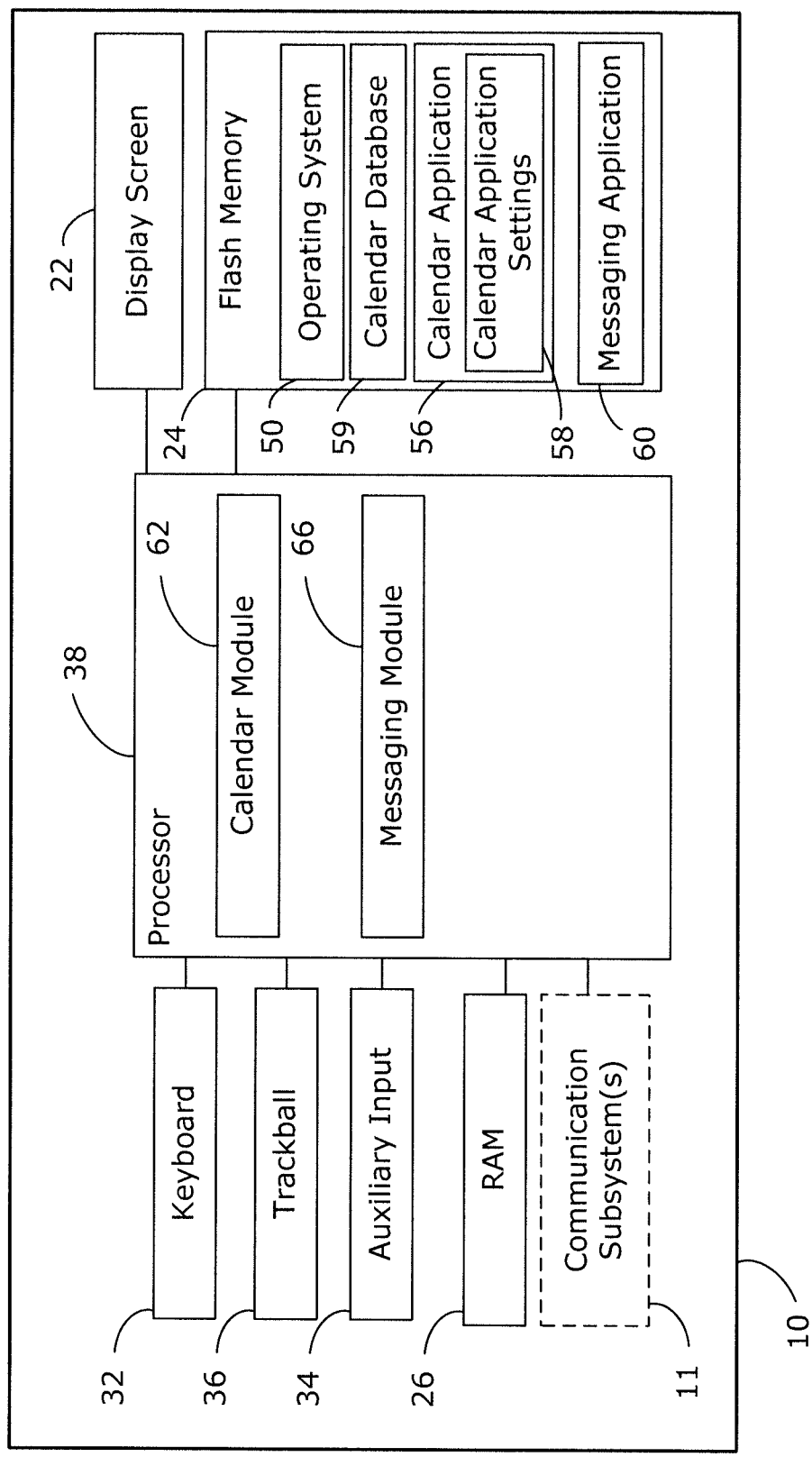
FIG. 1 is a block diagram of a mobile electronic device to which example embodiments of the present application can be applied.

Referring to FIG. 1 an electronic mobile electronic device 10 to which example embodiments can be applied will now be described. The mobile electronic device 10 includes a controller that includes at least one microprocessor 38 (and possibly more than one microprocessor) that controls the overall operation of the device. The microprocessor 38 interacts with device subsystems including a display screen 22, flash memory 24, random access memory (RAM) 26, communication subsystem(s) 11, and user input components such as a keyboard or keypad 32, clickable trackball 36 or other two-dimensional navigation mechanism, and optionally auxiliary on-screen navigation and/or selection input device(s) 34.

Some example embodiments of the mobile electronic device 10 include the communications subsystem(s) 11 for exchanging communications with one or more communications networks including, for example, cellular type wide area wireless networks and/or wireless local area networks. In some embodiments, the mobile electronic device 10 is a two-way, electronic communications device having data and possibly also voice communication capabilities. In some embodiments, the mobile electronic device 10 has the capability to exchange messages with other devices and computer systems on the Internet. Depending on the functionality provided by the mobile electronic device 10, in various example embodiments the mobile electronic device may be a multiple-mode communication device configured for both data and voice communications, a smartphone, a Personal Digital Assistant (PDA), or a mobile computer system among other things. In some example embodiments, the mobile electronic device 10 is not a wireless communications device. For example, there exist PDAs that are not capable of sending and receiving wireless communications in which case the communications subsystem(s) 11 may not be present.

Operating system software 50 and various software applications (for example, calendar application 56, and messaging application 60) used by the microprocessor 38 are, in a number of example embodiments, stored in a persistent store such as the flash memory 24 or similar storage element. Those skilled in the art will appreciate that the operating system 50, other software applications, or parts thereof, may be temporarily loaded into a volatile store such as the RAM 26.

The microprocessor 38, in addition to its operating system functions, can enable execution of software applications (for example, the calendar application 56 and the messaging application 60) on the mobile electronic device 10. A predetermined set of software applications which control basic device operations, including data and voice communication applications for example, will normally be installed on the mobile electronic device 10. In some embodiments, the processor 38 is configured to implement a number of modules for interacting with the various device subsystems described above (or other device subsystems). In some embodiments, some or part of the functionality of a number of these modules can be implemented through firmware or hardware components instead of, or in combination with, computer software instructions executed by the microprocessor 38 (or other processors).

As a first module example, under instructions from the calendar application 56 resident on the mobile electronic device 10, the processor 38 could be configured to implement a calendar module 62. The calendar module 62 facilitates the scheduling and reminding of the device user in relation to calendar events. In some embodiments, the calendar module 62 handles meeting (sometimes referred to as an "appointment") invitations sent and received over a communication network, through the communication subsystem 11. The communication subsystem 11 may be configured for accessing a calendar database (not shown) adapted to store calendar event data corresponding to entered calendar event details in the flash memory 24, the RAM 26 and/or some other computer readable medium such as a remotely located magnetic/optical-based disk drive, for example. The calendar module 62 is able to add, alter and delete event data in this database by way action queries, for example.

As a second module example, under instruction from the messaging application 60 resident on the mobile electronic device 10, the processor 38 could be configured to implement a messaging module 66. The messaging module 66 enables the composition of data items, such as e-mail messages for example. Such composed items may then be transmitted over a communication network through the communication subsystem 11. Conversely, messages can be received through the communication subsystem 11 for processing by the messaging module 66.

Figure 2:
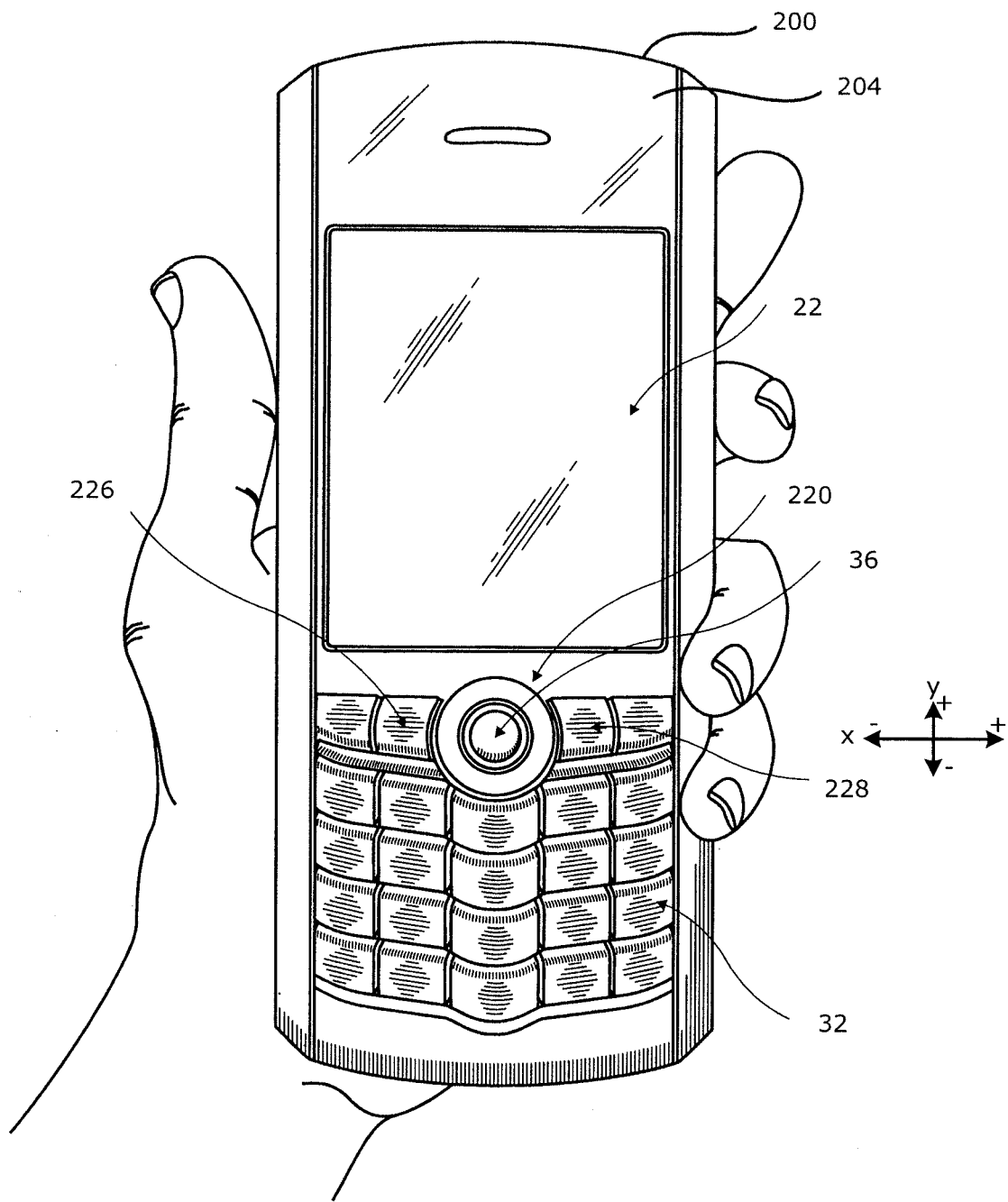
FIG. 2 is a front view of an example embodiment of the mobile electronic device of FIG. 1 in a user's hand.
Figure 3:
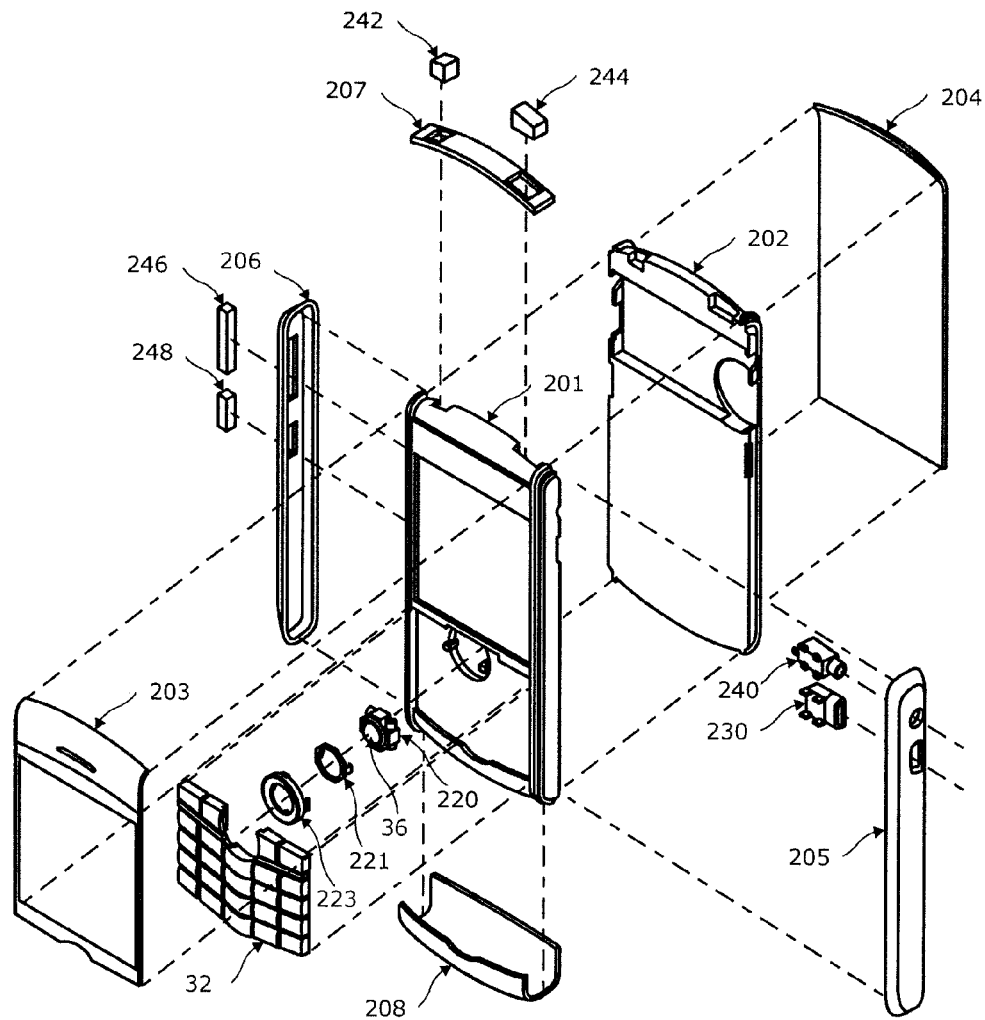
FIG. 3 is an exploded perspective view of the mobile electronic device of FIG. 2.

Referring now to FIGS. 2 and 3 an example embodiment of the mobile electronic device 10 will be described. The components and subsystems of mobile electronic device 10 are housed within a rigid case 200 that is configured to be held with one or two hands while the mobile electronic device 10 is in use. In the shown embodiment, the rigid case 200 is comprised of a support frame 201, lens plate 203 having a lens cover for protecting the display screen 22, back plate 204, right side element 205, left side element 206, top piece 207, and bottom piece 208. Other constructions are possible. In addition, in the shown embodiment the mobile electronic device 10 is a handheld electronic device which has device components which are dimensioned such that a user is capable of operating the mobile electronic device 10 using the same hand that is holding the device 10. As shown, the case 200 has a housing of unibody construction, but it is also contemplated that the mobile electronic device 10 may be of an alternative construction such as that commonly known as "clamshell" or "flip-phone" style which is comprised of two parts which are pivotally or slidably connected together. In some embodiments, the mobile electronic device 10 is small enough to fit inside a standard purse or coat pocket, clip to a belt, and/or mount on a belt-worn holster.

In the shown embodiment, the mobile electronic device 10 features the keyboard or keypad 32 on a front face 204 of the mobile electronic device 10 which is actuable by the thumb of the hand in which the device 10 is held. The user may also hold the mobile electronic device 10 in such a manner to enable two-thumb typing on the device 10. In order to accommodate palm-cradling of the mobile electronic device 10 by the average user, in some embodiments the device 10 is longer (height as shown in FIG. 3) than it is wide, and the width is approximately 2 to 3 inches. Other dimensions and sizes are used in other embodiments. In some embodiments, the mobile electronic device 10 is a handheld electronic device having a small display screen which occupies less than half of the front face 204 of the device 10, and in some example embodiments has dimensions between approximately 1 9/16" (H)×1 ½" (W) and approximately 1½" (H)×2" (W).

The keyboard 32 is horizontally positioned centrally between a left edge and a right edge of a front face 204 of the mobile electronic device 10. The mobile electronic device 10 comprises a display screen 22 located above the keyboard 32 for displaying a graphical user interface (GUI) of the device 10. The display screen 22 and keyboard 32 are located at the front face of the mobile electronic device 10.

The mobile electronic device 10 also comprises a two-dimensional navigation tool 220, which in the shown embodiment comprises a depressible (or "clickable") rolling member or trackball 36, which is used to move a cursor or focus across selectable items or fields of the GUI of the device 10. The navigation tool 12 is located substantially between the display screen 22 and the keyboard 32. The mobile electronic device 10 also comprises a menu key 226 which may be used to access context-sensitive menus comprising a context-sensitive list of options. In the shown embodiment, the menu key 226 is located to the left of the trackball 36. The options which are presented within the context-sensitive menu depend on the application, feature and/or other context from which the menu was invoked. The menus are based on the interface principle of "see and click". In this manner, users do not have to remember commands or options because they can view these options at any time. The mobile electronic device 10 also comprises a back key 228 which may be used to cancel actions or reverse ("back-up") through previous user interface screens or menus displayed on the display screen 22. In the shown embodiment, the back key 228 is located to the right of the trackball 36.

In the shown embodiment, the keyboard 32 comprises a plurality of keys with which alphabetic letters are associated and in which at least a portion of the individual keys have multiple letters associated therewith. This type of configuration is referred to as a reduced keyboard in comparison to a full keyboard described immediately below. The keyboard 32 can, among others come, in QWERTY, QWERTZ, AZERTY, and Dvorak layouts.

In some example embodiments, the keys of the keyboard 32 consist of number, pound and asterisk keys typically found on any telephone, plus a few additional keys associated with miscellaneous inputs (for example, a hang up or answer call key). The illustrated keyboard 32 also includes one or more keys that can be held down to give an alternative meaning to another of the keys (or other input component) when depressed. In at least some embodiments, these one or more keys include an "Alt" key. As will be appreciated by those skilled in the art, keys that give alternative meaning to other input components enable expanded input capability such as, for example, the ability to provide for so-called "shortcut keys" or "hot keys".

In alternative embodiments, the keyboard 32 comprises a full keyboard comprising a plurality of keys with which alphabetic letters are associated on one letter per key basis. It is contemplated that the keys may be directly marked with letters, or the letters may be presented adjacent, but clearly in association with a particular key. This one-to-one pairing between the letters and keys will be understood to persons of ordinary skill in the art and will not be described in detail herein. In order to facilitate user input, the alphabetic letters are typically configured in a familiar QWERTY, QWERTZ, AZERTY, or Dvorak layout, each of which is known in the art.

Referring now to FIG. 3, the internal components of the mobile electronic device 10 will be briefly described. As shown, the internal components of the mobile electronic device 10 are constructed on a single PCB (printed circuit board) 202. The keyboard 32 is positioned over dome switches (not shown) located on the PCB 202. In some embodiments, one switch is provided for every key on the keyboard. In other embodiments, more than one switch or less than one switch per key are possible configurations. A support frame 201 holds the keyboard 32 and two-dimensional navigation tool 220 in place above the PCB 202. The support frame 201 also provides an attachment point for the display (not shown). A lens plate 203 covers the display screen 22 to prevent damage. When assembled, the support frame 201 and the PCB 202 are attached to each other and the display screen 22 is positioned between the PCB 202 and support frame 201.

The trackball 36 can be rolled or rotated upwards towards an upper end of the mobile electronic device 10 or downwards towards a bottom end of the mobile electronic device 10, as indicated by the arrow "y". Typically, upward movement results in increasing or incrementing an associated value or advancing an on-screen selection icon or cursor used for selecting items presented in the user interface of the device 10 (referred to as the "focus"). In contrast, downward movement typically results in decreasing or decrementing an associated value or reversing the focus. Additionally, the trackball 36 can be rolled to left towards a left side of the front face 204 of the mobile electronic device 10 or right towards a right side of the front face 204 of the mobile electronic device 10, as indicated by the arrow "x". In this way, the device user can move the trackball 36 in the x or y directions thereby providing two dimensions of directional input for use in navigating through the various user interface screens of the mobile electronic device 10, for example. In at least some embodiments, one or more directional filters are provided for use by the operating system 50 to determine whether user input received by the trackball is primarily in the "x" or "y" direction. The directional filters are generally based on comparing the magnitude of movement of the trackball 36 in "y" direction to the magnitude of movement of the trackball 36 in the "x" direction. The output of the directional filters is a navigational input in either the "x" or "y" direction. The directional filters are used to provide unidirectional input to applications or functions on the mobile electronic device 10 which are not configured to accept two dimensions of directional/navigational input. The directional filters also provide increase usability. For example, in embodiments where up/down movement in the "y" direction changes the value of a field or subfield, and left/right movement in the "x" direction switches between adjacent fields or subfields, it would be undesirable for a small "accidental" movement in "x" direction to change fields or subfields while a user is attempting to change the value of a respective field, or vice versa. This also applies to embodiments in which the logical input of the "x" and "y" directions are reversed, i.e. left/right movement in the "x" direction changes the value of a field or subfield, and up/down movement in the "y" direction switches between adjacent fields or subfields. In at least some embodiments, the directional filters are applied in the calendar application 56.

In the illustrated embodiment, the trackball 36 protrudes through an opening in the rigid case 200 that is provided on its front face 204 so as to be adapted for manipulation by a thumb (or other hand digit) of a user of the mobile electronic device 10. In addition to being rollable, the trackball 35 can also be "clicked" or depressed inwardly. The trackball 36 is biased outwardly by a biasing mechanism (not shown) which provides some resistance to a downward depressing or clicking force of the device user. When depressed, the trackball 36 contacts a switch (not shown) such as a dome switch which is connected to the PCB 202.

The two-dimensional navigation mechanism 220 is frictionally engaged within the support frame 201. In the shown embodiment, the trackball 36 is held within an opening in the support frame 201 through the use of an outer removable ring 223 and an inner removable ring 221. The rings 221, 223 ensure that the navigation mechanism 220 and the trackball 36 are properly held in place.

In some embodiments, the two-dimensional navigation mechanism 220 is removable to allow for replacement of the navigation tool 220 if and/or when it becomes damaged or the user desires replacement with a different type of navigation tool 220. In the shown embodiment of FIG. 3, the navigation tool 220 is a trackball-based device having a clickable or depressible rolling member or trackball 36. Other two-dimensional navigation mechanisms 220 such as joysticks, four-way cursors, four-way optical sensors, and touch pads are also considered to be within the scope of this disclosure. When the navigation tool 220 is a trackball-based mechanism, the trackball 36 can be removed without removal of the entire two-dimensional navigation mechanism 220. The removal of the trackball 36 is enabled through the use of the outer removable ring 223 and inner removable ring 221.

A serial data port (such as a universal serial bus (USB) port) 230 and an earphone jack 240 are attached to the PCB 202 and are further held in place by the right side element 205. Buttons 242, 244, 246, 248 are attached to switches (not shown) which are connected to the PCB 202. In some embodiments, the button 242 is a power ON/OFF toggle button, the button 244 is a speaker mute ON/OFF toggle button, and the buttons 246 and 248 are volume up and volume down buttons respectively.

During the final assembly of the mobile electronic device 10, the top piece 207 and bottom piece 208 are placed in contact with support frame 201. The assembly interconnects the right side element 205 and left side element 206 with the support frame 201, PCB 202, and lens plate 203. These side elements 205, 206 provide additional protection and strength to the support structure of the device 10. In some embodiments, the back plate 204 is removably attached to the other elements of the device.

Figure 4:
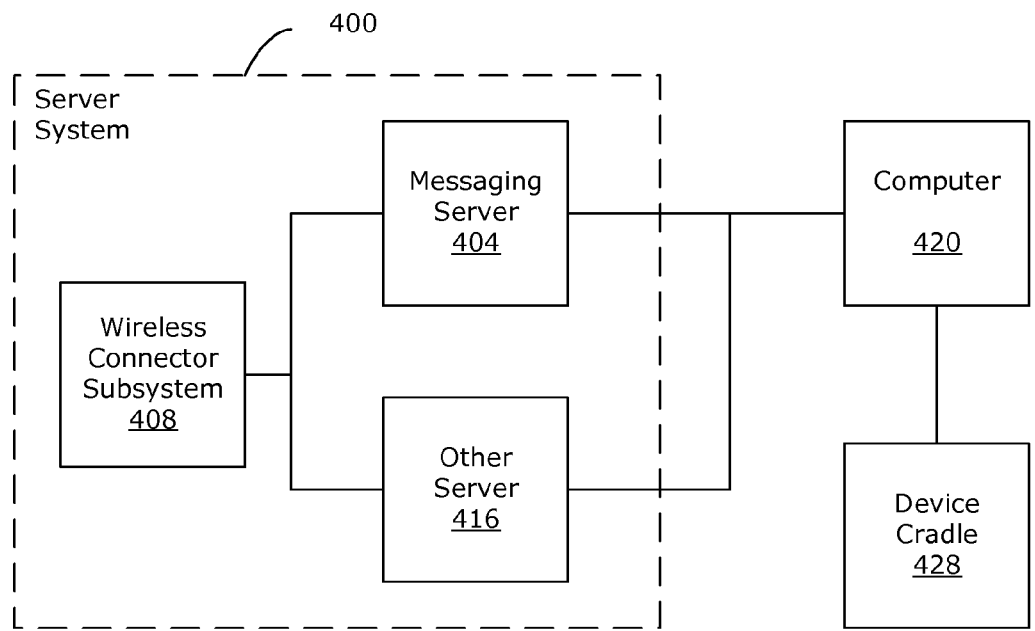
FIG. 4 is a block diagram of an example server system that provides services to some embodiments of the mobile electronic device of FIG. 1.

FIG. 4 shows a block diagram of an example server system 400 that provides services to some embodiments of the mobile electronic device 10. Typically, when a mobile electronic device 10 is initially set-up or provisioned for a user, the mobile electronic device 10 will become associated with a server system 400 that is part of an enterprise network that is operated by an organization with which the device user is affiliated. Within the illustrated server system 400, at least one messaging server 404, which may for example be implemented using Microsoft Exchange™ Server, IBM Lotus Domino™ Server, Novell GroupWise™ Server, or some other similar server software, is typically connected to a firewall for receiving e-mail messages from the Internet and rerouting those messages (however in at least one example embodiment the server 404 is a Personal Information Management server without messaging support capabilities). In addition to the messaging server 404 typically acting as a primary interface for the exchange of messages within a corporation (or organization) and over the Internet, the messaging server 404 also typically provides functions related to the management of data associated with calendar and task lists, for example. As will be appreciated by those skilled in the art, objects and other data received by the messaging server 404 are typically stored in a message store (not explicitly shown) for possible retrieval in the future. It will additionally be understood that, in some embodiments, an enterprise network will include a server system 400 having a plurality of messaging servers 404. Some of these plurality of messaging servers may be implemented using server software produced by one company (e.g. Microsoft Exchange™ Server produced by Microsoft Corporation) while others may be implemented e using server software produced by a different company (e.g. IBM Lotus Domino™ Server produced by International Business Machines Corporation or IBM).

The illustrated server system 400 also includes a wireless connector server or subsystem 408. In some embodiments, the wireless connector subsystem 408 relays received electronic messages from a message store within the enterprise network out to a mobile electronic device 10, and conversely the wireless connector subsystem 408 can also facilitate the handling of messages composed on a mobile electronic device 10, which are sent to the messaging server 404 for subsequent delivery. The wireless connector subsystem 408 functions as an interface between the enterprise network (to which it belongs) and a wireless network. As will be appreciated by those skilled in the art, an enterprise network may, in some instances, include multiple wireless connector subsystems 408 such as in some implementations where a large number of mobile electronic devices need to be supported.

The server system 400 may optionally include one or more other servers 416 enabling the server system 400 to provide other types of services to mobile electronic devices 10 besides those related to messages, calendar entries, etc. In some embodiments, the server 416 could be a collaboration server employed in conjunction with one or more other collaboration tools in relation to cooperative document revision, team rooms, discussions stored in discussion databases and the like. In other embodiments, the server 416 could be a type of media server enabling the server system 400 to provide services similar to those associated with unified messaging systems.

A number of computers 420 (for convenience only one is shown in FIG. 4) communicate with the server system 400 over, for example, a Local Area Network (LAN). As subsequently explained, the computer 420 can be employed in provisioning of the mobile electronic device 10. Coupled to the computer 420 is a device cradle 428 that can physically receive the mobile electronic device 10. The cradle 428 may be coupled to the computer 420 by a serial or a universal serial bus (USB) connection, for example. Often, a computer 420 and a mobile electronic device 10 will each be associated with a common user. Alternatively, in other embodiments the mobile electronic device 10 may connect to the computer 420 via a direct physical interface or short-range wireless communication interface without the need for the cradle 428. The physical interface may comprise one or more of an Ethernet port, USB port, Firewire™ (also known as an IEEE 1394 interface) port, or other serial data port. The short-range wireless communication interface may comprise one or more of an infrared (IR) or short-range radio frequency (RF) communication such as Bluetooth® or other wireless personal area network (PAN) interface which allows the mobile electronic device 10 to exchange information with the computer 420.

When the mobile electronic device 10 is in the cradle 428, provisioning of the mobile electronic device 10 can be carried out through communications with the server system 400 mediated by the computer 420. In some embodiments, such provisioning may change and/or add to calendar application settings 58 (FIG. 1) and it will be understood that the calendar application settings 58 may be a file(s) (or some other object or objects) loaded by the calendar application 56 when the application is launched. As will be appreciated by those skilled in the art, the calendar application settings 58 dictate the behaviour of the calendar application 56.

Synchronization may also be carried out when the mobile electronic device 10 is in the cradle 428. As understood by those skilled in the art, synchronization involves the mobile electronic device 10 and the server system 400 updating each other with respect to any new information on either device. In some embodiments, a database that stores event data such as calendar event data, for example, will exist on both the server system 400 and the mobile electronic device 10; however at times the server system's database may, for instance, only be as up-to-date as the last time that synchronization was carried out, whereas the mobile electronic device's database (calendar database 59 in FIG. 1) is fully up-to-date, or vice-versa. In at least some embodiments, synchronizing updates of calendar event data between the calendar databases maintained on the server system 400 and the mobile electronic device 10 is done over the air instead of or in addition to through the above described "docked" synchronization. In some embodiments, calendar event information is stored in a database at computer 420 rather than (or in addition to) on the server system 400, and the calendar databases at the computer and the mobile electronic device 10 are periodically synchronized either through a wired connection when the device is docked in cradle 428, or through a wireless connection through the server system 400. In some embodiments, very little calendar data is stored locally at the mobile electronic device 10, and detailed calendar event information must be wirelessly from the server system 400 to be viewed at the mobile electronic device 10.

Figure 5:
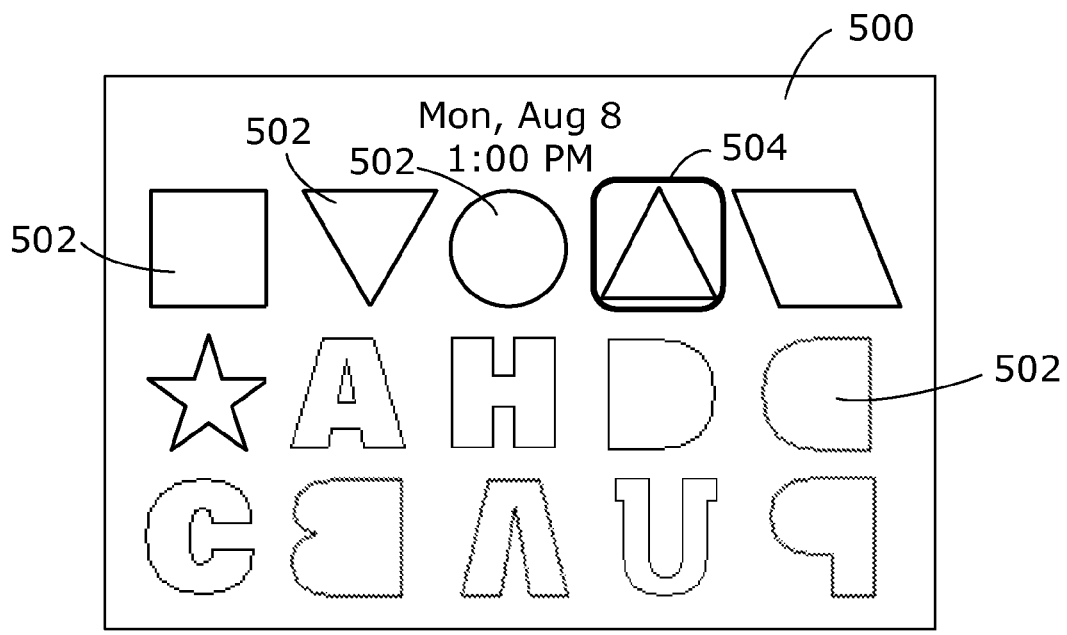
FIG. 5 is a block diagram of an example user interface screen of an operating system within which a user of the mobile electronic device of shown in FIG. 1 can request that an application be run.

Referring to FIG. 5 an example user interface screen 500 generated by the operating system 50 will be described. The user interface screen 500 provides the device user with choices of applications or functions that can be run on the mobile electronic device 10. In the illustrated embodiment, various applications each have an associated selectable icon 502. For instance, one of the icons 502 might be associated with the calendar application 56, and another of the icons 502 might be associated with the messaging application 60. In at least some embodiments, the device user can move the trackball 36 in either the x or y direction, causing an on-screen selection cursor or focus 504 to move through the icons 502 until it is positioned on the icon 502 associated with the desired application or function. Selection of an icon 502 by the focus 504 causes the icon 502 to become highlighted. Highlighting typically involves changing the colour of the background of the icon 502 and/or changing the colour of the icon 502 itself. Highlighting may also involve changing the appearance of the selected icon from an idle/unselected icon to a different active/selected icon associated with the respective application or function.

Once selected, the device user can then "click" or depress the trackball 36 to launch the application logically associated with the selected icon 502 which is highlighted by the focus 504 such as, for example, the calendar application 56. As will be appreciated by persons skilled in the art, input action of "clicking" or depressing the trackball 36 is translated by the operating system 50 into a request to launch or invoke the application or function associated with the selected icon.

Once the operating system 50 launches the associated application or function, the user interface screen 500 on the display screen 22 may be replaced by the respective start-up user interface screen that is generated by the launched application or function. The device user would then typically proceed through further user interface screens of the application that was launched. For example, if the device user launches the calendar application 56, the device user may choose to navigate through a number of user interface screens in order to enter or change the details of various calendar events.

Figure 6A:
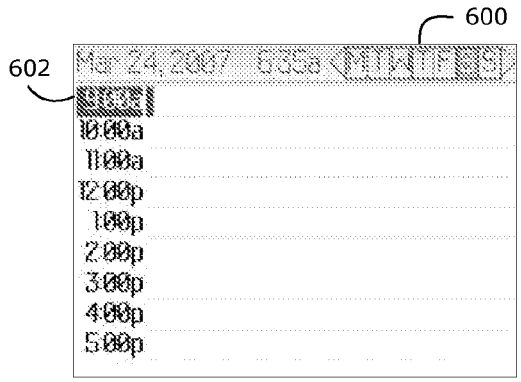
FIGS. 6A to 6D are example screen captures of a Day View of a calendar application run on the mobile electronic device in accordance with one example embodiment.
Figure 6B:
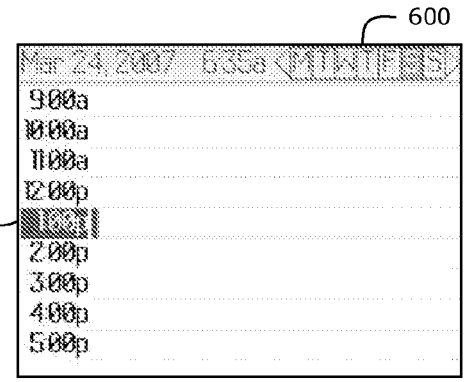
Figure 6C:
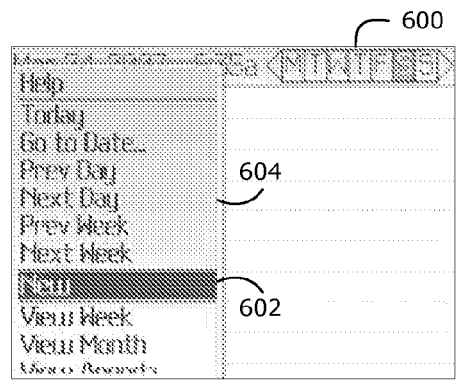

Referring now to FIGS. 6A to 6D, a series of example user interface screens of the calendar application 56 for display on a display screen 22 of a mobile electronic device 10 will be described. FIGS. 6A to 6C illustrate a start-up interface screen 600 of the calendar application 56 which, in the shown embodiment, is referred to as a "Day View". The Day View displays calendar events and time slots for a given day which, in the illustrated embodiment, is Mar. 24, 2007.

In other embodiments, the start-up interface screen may be a Week View, Month View, Agenda View or other view. While not explicitly shown, persons ordinarily skilled in the art would be familiar with or understand how arrangements and configurations for implementing calendar user interface screens for such views. When a different view is currently displayed on the display screen 22, the user may navigate to the Day View for a particular day, for example, using a context-sensitive menu invoked by the menu key 226.

While not explicitly shown, the calendar application 56 typically provides options such as, but not limited to: default reminder duration, default appointment duration, snooze duration, start of day (time), end of day (time), and the first day of the week. Some or all of these options may be user configurable in some embodiments.

The illustrated start-up interface screen 600 is a Day view, which in the shown embodiment comprises a two column table representing a calendar day. The table is comprised of a number of rows each representing a time slots. The left hand column comprises fields which list times of the respective time slots, which in the shown embodiment have durations of one hour and span a time period from 9:00 AM through to 5:00 PM for the date of Mar. 24, 2007 (however any suitable time intervals and time period are contemplated). The right hand column provides fields which display short subject descriptions corresponding to appointments, meetings or other calendar events (if any) at the corresponding times in the left hand column.

In the illustrated embodiment, the device user can navigate a focus 602 up or down the table to select a particular time slot or calendar entry within the table by moving the trackball 36 up or down in the y direction. The device user may, for example, choose to navigate the focus 602 down to the column entry "1:00 PM" (as shown in FIG. 6B).

Selection of a particular calendar entry or time slot causes the respective time field in the left hand column to become highlighted. In the shown embodiment, highlighting involves changing the background colour of the time field in the left hand column and changing the text colour of the displayed text. In the shown embodiment, the background colour is darkened (for example, from white to blue or black) and the text colour is changed from black or other colour to white. Other colour palettes for illustrating a selected field within a calendar screen and other schemes for changing background and text colours to change the appearance of the selected field are also contemplated. For example, in other embodiments only the background colour of the field is changed and the text colour remains unchanged. In some embodiments, all or a portion of the subject description field in the right hand column is empty may also be highlighted. In some embodiments, all or a portion of the subject description field in the right hand column is empty is highlighted only if the field is empty, as shown in FIG. 6B.

In response to one or more predetermined user input activities such as depressing the menu key 226, an option menu 604 comprising a list of one or more selectable calendar functions is displayed on the display screen 22 of the mobile electronic device 10, as shown in FIG. 6C. The focus 602 can be moved up or down through the list in the option menu 604 via respective movement of the trackball 36 in the y direction to select an option from the option menu 604 to launch or invoke through subsequent depression of the trackball 36 (or other user selection activity).

In the illustrated embodiment, the option menu 604 includes selectable calendar functions such as, but not limited to, "Today", "Go to Date", "Prev Day" and "Next Day", "New", "View Week", "View Month", "View Agenda", "Options" and "Close". The "Today" function changes the displayed view to the Day View calendar screen for the current day. The "Go to Date" function launches a menu for inputting a particular date of interest and then viewing the Day View calendar screen of the date of interest. The "Prev Day" and "Next Day" functions switch to the Day View calendar screen for the previous day and next day, respectively. The "View Week" function switches the view to the Week View for the current week. The "View Month" function switches the view to the Month View for the current month. The "View Agenda" function switches the view to the Agenda View which displays input calendar events, starting with those of the current day (if any).

If the menu key 226 is clicked or depressed when the focus 602 is located at a scheduled calendar event, an "Open" option and a "Delete" option are also included in the option menu 604 for respectively opening and deleting the selected calendar entry. If the trackball 36 is clicked or depressed (or other predetermined user input activity occurs) when the focus 602 is located at a scheduled calendar event, then an "Appointment Details View" is displayed on the display screen 22 of the mobile electronic device 10. The Appointment Details View provides details of the calendar event which is the same or similar to that in the New Appointment View, described below.

Figure 6D:
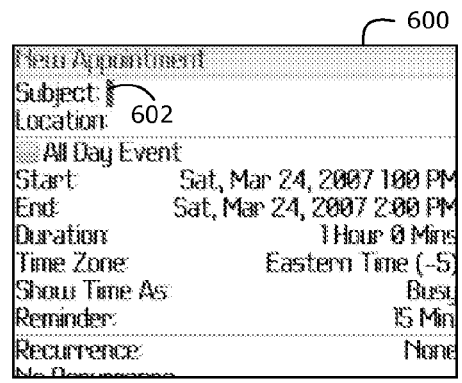

The "New" option is provided in the option menu 604 for entering a new calendar event. In the shown embodiment, the device user may navigate to the "New" option within the option menu 604 via respective movement of the trackball 36 in the y direction. Launching or invoking the "New" function causes a calendar interface screen 610 for a "New Appointment View" to be displayed on the display screen 22 of the mobile electronic device 10, as shown in FIG. 6D. In some embodiments, the "New" option may be selected by the focus 602 by default when the option menu 604 is invoked by the user from an empty time slot (for example, by pressing the menu key 226). In some embodiments, either clicking or depressing the trackball 36 when an empty time slot is selected by the focus 602 also causes a calendar interface screen 610 for the "New Appointment View" to be displayed on the display screen 22 of the mobile electronic device 10. The "New Appointment View" may also be launched from other views such as the Week View, Month View and/or Agenda View Referring now to FIG. 7 an example calendar user interface screen 700 of a New Appointment View will be described. A focus 701 is provided within the calendar screen 700 which can be used to navigate through the various calendar event details via respective movement of the trackball 36 in the x or y direction to set (for new appointments) or change (for existing appointments) these details.

The calendar screen 700 comprises a two-dimensional selectable screen representing a calendar event. The two-dimensional selectable screen in the shown embodiment comprises a two-column table having a number of rows each representing a calendar event detail. At least one of the columns in each row includes a selectable field which is editable by the device user by either freeform text entry or by selection from predefined options (for example via scrollable pop-up or dropdown lists or check boxes). One of the columns in each row may be label which provides a short description of the respective selectable/editable field.

In the illustrated embodiment, the calendar screen 700 comprises the following even details having a respective label and selectable/editable field: "Subject" 702, "Location" 704, "All Day Event" check box 706, "Start" (date/time) 708, "End" (date/time) 710, "Duration" 712, "Time Zone" 714, "Show Time As" 716, "Reminder" 718, "Recurrence" 720, "Mark as Private" check box 722, and "Notes" 724.

In the illustrated embodiment, the start field 708 and end field 710 provided start and end details which are presented within a single line. However, if the application settings for the calendar application 56 specify a large font size then, depending on the size of the display screen 22, the start field 708 and end field 710 may be presented within two or more lines on the display screen 22. The start and end details are presented in terms of a date and a time, and in the illustrated embodiment, comprises selectable and editable fields comprising the following subfields: month 732, day 734, year 736, hour 738, minute 740, and an AM/PM indicator 742. The weekday is also shown in both the start field 708 and end field 710, however this value is automatically generated and displayed on the display screen 22 based on the value of the month subfield 732, day subfield 734, and year subfield 736, and an internal calendar.

It will be understood that in alternative embodiments, calendar event details of the calendar screen 700 may include more or fewer details than in the above-described embodiment. For example, seconds and milliseconds could be provided in the start field 708, end field 710 and/or the duration field 712. In addition, the format of various date and/or time fields (such as the start field 708, end field 710 and/or the duration field 712) may be subject to locale and user preferences such as, for example, a 24-hour format (rather than a 12-hour clock with an AM/PM indicator 742 as in the shown embodiment), the re-ordering of subfields within respective fields (such as the month subfield 732, day subfield 734, year subfield 736, hour subfield 738, minute subfield 740, for example), changing separator symbols, and translating the names of calendar days and/or months.

Figure 7:
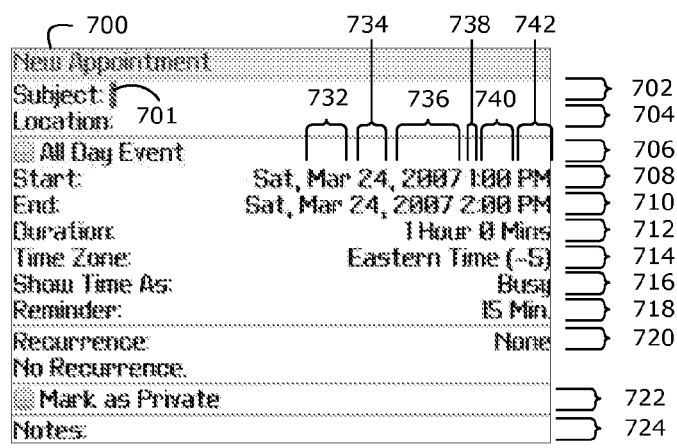
FIG. 7 is an example screen capture of a new calendar entry user interface screen of a calendar application run on the mobile electronic device in accordance with one example embodiment.

In at least some embodiments, the minute field 740 is configured to increase and decrease in 15 minute increments. In at least some embodiments, the value of the duration field 712 is automatically calculated once the start field 708 and end field 710 values have been entered for a new appointment or updated for an existing appointment. Conversely, in at least some embodiments, the value of the end field 710 is logically linked within the underlying program code to the duration field 712 so that if the value of the duration field 712 is changed, the value of the end field 710 is automatically updated. As shown in FIG. 7, in at least some embodiments, the duration field 712 comprises a plurality of selectable and editable subfields comprising an hour and a minute subfield.

In some embodiments, the displayed calendar details may be retrieved from a calendar database 59 stored locally on the mobile electronic device 10. As indicated above, in at least some embodiments the locally stored calendar database 59 is periodically synchronized with a corresponding calendar database maintained at server system 400 or computer 420. In some embodiments, when the device user "opens" a calendar event for viewing at the mobile electronic device 10, at least some of the displayed calendar event details are retrieved wirelessly over a wireless data network from a database maintained at the server system or computer 420. Similarly, in some embodiments, when the device user "creates" a new calendar event on the mobile electronic device 10, at least some of the calendar event details are transmitted wirelessly over the wireless data network to the database maintained at the server system or computer 420.

Reference will now be made to FIGS. 8A to 8J to explain the entry of calendar event details in accordance with one example embodiment. FIGS. 8A to 8J show a series of example user interface screens of the calendar application 56 for display on a display screen 22 of a mobile electronic device 10. The calendar screen 800 is similar to the calendar screen 700 described above in connection with FIG. 7, but is vertically scrollable/expandable so that the user may view rows which do not fit on the display screen 22 at the current text size or screen resolution.

Figures 8G, 8H, 8I, 8J:
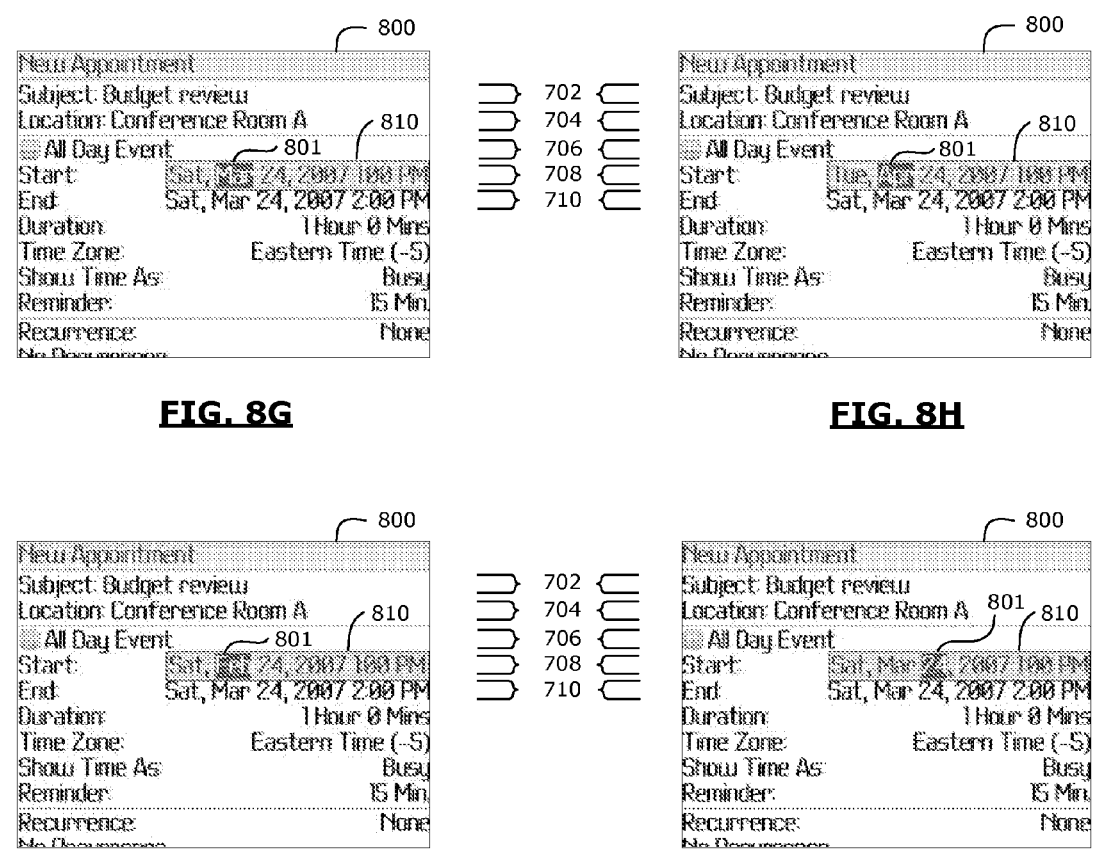

The calendar screen 800 illustrated in FIGS. 8A to 8J is a calendar screen for entering a new appointment or other calendar entry. In FIG. 8A, the calendar screen 800 is blank. A focus 801 is provided within the calendar screen 800 which can be used to navigate through the various calendar event details via respective movement of the trackball 36 in the x or y direction to select a desired field within the calendar screen 800. Selection of a field (or subfield with a given field) by the focus 801 causes the respective field to become highlighted, as described above.

At least some fields with the calendar screen 800 have an "edit mode" which may be launched or invoked via respective user input which, in at least some embodiments, may be launched or invoked by clicking or depressing the trackball 36 when the field is selected by the focus 801. In at least some embodiments, fields which may have an edit mode are fields have two or more selectable and editable subfields such as the start field 708, end field 710, and duration field 712. In some embodiments, all fields within the calendar screen 800 may be editable and have a corresponding "edit mode" with respective values. However, it will be appreciated if the field does not have a subfield that left/right navigation between adjacent fields will not occur. In such embodiments, left/right movement may have either no effect or may result it increasing/decreasing in the value of the respective field in the same manner as up/down movement. For example, in such embodiments the calendar application 56 may be configured such that moving the trackball 36 left or up produces the same logical input, and moving the trackball 36 right or down produces the same logical input.

In FIG. 8A, the focus 801 is positioned within the subject field 702 (which may be the default starting field). The device user may enter a subject description within the subject field 702 using an input device of the mobile electronic device 10 such as the keyboard 32. After entry of the subject description in the subject field 702, the subject description or a shortened version thereof (if the description is too long, for example) will be displayed within the subject field of the right hand column of the Day View described above. In the shown embodiment, a subject description of "Budget review" is entered in the subject field 702.

As shown in FIG. 8B, after entry of the subject in the subject field 702, the user may navigate to the next field within the calendar screen 800 using the trackball 36, for example, by moving the trackball 36 downwardly. The next field in the calendar screen 800 is the location field 704 where the user may enter a location description using an input device of the mobile electronic device 10 such as the keyboard 32. In the shown embodiment, a location description of "Conference Room A" is entered in the location field 704.

As shown in FIG. 8C, after entry of the location in the location field 704, the user may navigate to the next field within the calendar screen 800 using the trackball 36, for example, by moving the trackball 36 downwardly. The next field in the calendar screen 800 is the "All Day Event" check box 706 which the user can "check" or select by clicking or depressing the trackball 36 (or via other user input activity). In the shown embodiment, the calendar entry being created is not for an all day event and so the user navigates to the next field within the calendar screen 800 using the trackball 36, for example, by moving the trackball 36 downwardly. The next field in the calendar screen 800 is the start field 708.

As described above in connection with FIG. 7, the start field 708 comprises a number of selectable and editable subfields. In the shown embodiment, the start field 708 comprises, in series (moving left to right in the calendar screen 800), the following subfields: a month subfield 732, day subfield 734, year subfield 736, hour subfield 738, minute subfield 740, and an AM/PM indicator subfield 742. The value of the start field 708 may be set by the user by selecting from predefined options rather than freeform text entry, as described in the following paragraphs.

The user may navigate between subfields within the start field 708 by moving the focus 801 left or right, for example, by respective movement of the trackball 36. Moving the trackball 36 rightward moves the focus 801 to the adjacent subfield to the right, as shown in FIGS. 8D and 8E. In FIG. 8D, the focus 801 is positioned within the month subfield 732 (which may be the default starting field). Rightward movement of the trackball 36 moves the focus 801 from the month field 732 (FIG. 8D) to the adjacent day field 734 (FIG. 8E). Further rightward movement of the trackball 36 moves the focus 801 from the day field 734 to the next adjacent year field 736 to the right (not shown). Conversely, leftward movement of the trackball 36 when the day field 734 is selected moves the focus 801 from the day field 734 (FIG. 8E) back to the month field 732 (FIG. 8D).

As shown in FIGS. 8E and 8F, downward movement of the trackball 36 when the month field 732 is selected moves the focus 801 from the month field 732 in the start field 708 to the corresponding month field 732 in the end field 710 in the next row (FIG. 8F).

Referring now to FIGS. 8G to 8J, an example embodiment of an edit mode of the calendar screen 800 will be described. To enter the edit mode, the user clicks or depresses the trackball 36 when the desired field is selected by the focus 801. In the shown embodiment, the desired field is the start field 708. When in the edit mode, a frame or edit box 810 is displayed around the field being edited. The edit box 810 provides a visual indicator to the user of the field being edited. In some embodiments, the edit box 810 is filled with a background colour which is different than a main background colour of the calendar screen 800. In the shown embodiment, the background colour of the edit box 810 is darker (i.e., grey or black) than the main background colour of the calendar screen 800 (i.e., white). In some embodiments, the text colour of the text with the edit box 810 (i.e., of the field being edited) is also changed. Typically, the text colour is lightened when the background colour is darkened and vice versa (i.e., changed from black to grey in the shown embodiment). Other colour palettes for illustrating a field currently being edited within a calendar screen, and other schemes for changing background and text colour or otherwise changing the appearance of the field to provide a visual indicator to the user that the field is in the edit mode are also contemplated. For example, in other embodiments only the background colour of the field is changed and the text colour remains unchanged.

Within the edit mode, the user may navigate the focus 801 between adjacent subfields within the edit box 810, for example, by moving the trackball 36 left or right. Selection of a subfield by the focus 801 causes the respective subfield to become highlighted in a similar manner as when navigating between fields or subfields when not in the edit mode. In the shown embodiment, highlighting a subfield when in the edit mode involves changing the background colour of the subfield from that of the edit box 810 (which is grey in the shown embodiment) and main background colour of the calendar screen 800 (which is white in the shown embodiment). In the shown embodiment, the subfield selected by the focus 801 is coloured blue, while the edit box is coloured grey, and the main background colour of the calendar screen 800 is coloured white. In some embodiments, the text colour of the text of the selected subfield is also changed. Typically, the text colour is lightened when the background colour is darkened and vice versa. In the shown embodiment, the text colour of the currently selected field is changed from grey to white. Other colour palettes for illustrating a selected subfield within the edit box 810, and other schemes for changing background and text colour or otherwise changing the appearance of a selected subfield to provide a visual indicator to the user that that the subfield in the edit box is currently selected are also contemplated. For example, in other embodiments only the background colour of the field is changed and the text colour remains unchanged.

Within the edit mode, upward or downward movement of the trackball 36 causes the value of the selected subfield to change. As shown in FIGS. 8G to 8I, the focus 801 is positioned within the calendar screen 800 so as to select the month subfield 732 (which may be the default starting field) in the start field 708. In the shown embodiment, the value of the month subfield 732 is "Mar" representing the month of March. Upward movement of the trackball 36 advances or increments the value of the month subfield 732 from "Mar" (FIG. 8G) to "Apr" representing the month of April (FIG. 8H). Further upward movement of the trackball 36 would further advance the value of the month subfield 732. Conversely, downward movement of the trackball 36 retreats or decrements the value of the month subfield 732 from "Mar" (FIG. 8G) to "Feb" representing the month of February (FIG. 8I). Further downward movement of the trackball 36 would further retreat the value of the month subfield 732

While not shown, it will be appreciated by that if the focus 801 was moved by the user to a different subfield within the start field 708, such as the day 734, year 736, hour 738, minute 740 or AM/PM indicator 742, upward movement of the trackball 36 would have the same result of advancing/increasing/incrementing the value of the respective subfield, and that downward movement of the trackball 36 would have the same result of retreating/decreasing/decrementing the value of the respective subfield.

As shown in FIGS. 8G and 8J, in some embodiments, within the edit mode left or right movement of the trackball 36 causes the focus 801 to move between adjacent subfields. In the screen capture of FIG. 8G, the month subfield 732 is selected by the focus 801 within the edit mode. Rightward movement of the trackball 36 moves the focus 801 from the month subfield 732 (FIG. 8G) to the day subfield 734 (FIG. 8J). Further rightward movement of the trackball 36 would move the focus 801 to the next adjacent year subfield 736 to the right (not shown). Conversely, leftward movement of the trackball 36 when the day subfield 734 is selected would move the focus 801 from the day subfield 734 (FIG. 8J) back to the month subfield 732 (FIG. 8G). As described above, selection of a subfield causes the subfield to become highlighted.

In other embodiments, the calendar application 56 of the mobile electronic device 10 is configured to accept only one dimensional input from the trackball 36 when in the edit mode. In such embodiments, navigation between adjacent subfields when in the edit mode is not permitted, and the two-dimensions of directional input provided by the trackball 36 are logically matched or paired to produce a corresponding user input. For example, the left/right directional input may be configured to be the same as the up/down directional input. This has the result that moving the trackball 36 left or up produces the same input (such as increasing/advancing the value of the respective field in some embodiments), and moving the trackball 36 right or down produces the same input (such as decreasing/retreating the value of the respective field in some embodiments).

When creating a new appointment or other calendar entry and moving/scrolling between the fields 702-724 in the calendar screen 800 (for example, from the start field 708 to the end field 710), the focus 802 is typically placed on the most commonly edited subfields (if any subfields), for example as a default setting (which may be configurable in some embodiments). For example, in the start field 708 and end field 710, the focus 802 will select and highlight the hour subfield 738, an in the duration field 712, the focus 802 will select and highlight the hour subfield.

After the device user has finished all changes to the respective field (the start field 708 in the illustrated example), the user can accept the changes by again clicking or depressing the trackball 36 (or other user input activity). Accepting the changes by clicking or depressing the trackball 36 exits the edit mode of the respective field and returns the device user to a navigation mode of the calendar screen 800 in which the user may move the focus 801 to a field of interest to set the calendar event details. The edit box 810 displayed around the field is removed and the fill area and text of the field are returned to that the defaults of the calendar screen 800. It will be appreciated that not all calendar event details need to be specified to generate a valid calendar entry. For example, a subject and location are not required. Furthermore, default field values may be used for many, if not all, fields with the calendar screen 800.

In some embodiments, when all changes have been made to the fields of the calendar screen 800, a device user can save the changes to the database 59 (for eventual synchronization with the calendar database maintained at server system 400). New calendar entries or modifications to the existing calendar entries may necessarily be effectuated immediately by clicking or depressing the trackball 36 but may instead be effectuated by some series of user input (such as a series selection list navigation(s) and/or combination of trackball 36 movements) to obtain user input regarding whether the changes should be saved to the mobile electronic device 10 (and database 59 in some embodiments), discarded, or whether the user should be returned to the calendar screen 800 to continue editing the calendar event details.

It will be appreciated that fields having an edit mode, as described above, are fields which comprise a number of selectable and editable subfields. In the shown embodiment, the start field 708 has the month subfield 732 and AM/PM indicator 742 at its left and rights ends, respectively. In some embodiments, the terminal (i.e., end) subfields define respective ends of the selectable range within the field. In some embodiments, user attempts to move the focus 801 beyond the ends of selectable range and further movement of the trackball has no effect. However, it is also contemplated that navigation with the field may employ a "wrap-type" navigation wherein further movement of the trackball 36 when the focus 801 is positioned at one end of the field will move the focus 801 to the opposite end of the field. "Wrap-type" navigation is known in the art and will not be described herein. It is also contemplated that, when increasing or decreasing values of a respective subfield within a list of predefined options, that a wrap-type navigation method may be used. This type of navigation allows the device user to sequentially cycle through the available options. When the user advances beyond the last available option (or retreats beyond the first available option), the list of available options are repeated in series.

It will be appreciated that, while the editing of a field of the calendar screen 800 having a number of selectable and editable subfields has been described in the context of the start field 708, the innovations described herein also apply to other fields having two or more selectable and editable subfields such as, for example, the end field 710 and duration field 712. It will also be appreciated that the innovations described herein may also be applied to user interface screens for other applications having fields which comprise a number of selectable and editable subfields, and that the innovations described herein are not limited to calendar applications. For example, the entry of tasks and alarm settings may be implemented via a similar user interface screen. The innovations described herein may also be applied to non-date and non-time fields provided such fields contain multiple subfields each having two or more predetermined values from which the user may select and set the desired value. For example, the innovations described herein could be used to a font selection option which, in one example, could be presented to the user in the form of:

Font: [Family], [Size], [Style]

wherein [Family], [Size] and [Style] are each selectable subfields of the Font field (in a display options menu, for example), having two or more predetermined values from which the user may select and set the desired value for each subfield, for example, via up/down movement of the trackball 36 when the respective subfield is selected by the focus.

While FIGS. 8A to 8J and the above-description relate primarily to calendar user interface screens for entering a new appointment (sometimes referred to as a "New Appointment View"), it will be appreciated that the innovations described above also apply to calendar screens for viewing and/or changing calendar event details of existing calendar events (sometimes referred to as an "Appointment Details View").

It will be understood that the calendar application 56 need not be a distinct application which may be launched invoked by way one of the icons 502 within the screen 500 (FIG. 5) of the operating system 50: the calendar application 56 could, for example, be an integrated component of the messaging application 60. Some or all of the functionality of applications 56 and 60 could in some embodiments be incorporated into a personal information management ("PIM") application.

The term "appointment" has been used in the above examples and in some of the figures, however this term is used for convenience only and is not intended to be limiting. The innovations described herein apply to all types of calendar events within a calendar application.

It will be appreciated that the above-described method and mobile electronic device for two-dimensional navigation improves the display and navigation of fields in a GUI screen such as, for example, that of a calendar application. Two-dimensional navigation reduces the processing steps required by the processor of the mobile electronic device when navigating between fields of a GUI screen compared with one-dimensional navigation such as, for example, sequentially cycling through a plurality of fields. The use of a depressible trackball for two-dimensional navigation improves user input entry by allowing an edit mode of a field to be entered by depressing the trackball a first time, and to be exited by depressing the trackball a further time. This method of entering and exiting an edit mode requires fewer processing steps to be completed by the processor of the mobile electronic device when compared with other solutions which require more steps or complex steps such as, for example, calling a context-sensitive menu and selecting the edit mode from a list of options and calling a context-sensitive menu to accept changes and exit the edit mode. These features also improve the usability of the mobile electronic device for device users. Furthermore, in at least some embodiments, the method and mobile electronic device provide an improved display technique which provides a visual indication of a selected field or subfield, both in and out of the edit mode, and in at least some embodiments, provides a visual indication that a particular field is being edited. These visual indications further improve the usability of the mobile electronic device for device users.

While the present application is primarily described as a method, a person of ordinary skill in the art will understand that the present application is also directed to apparatus such as a mobile communication device, server and communication system for carrying out the described methods and including components for performing each described method step, be it by way of hardware components, a computer programmed by appropriate software to enable the practice of the disclosed method, by any combination of the two, or in any other manner. Moreover, an article of manufacture for use with the apparatus, such as a pre-recorded storage device or other similar computer readable medium including program instructions recorded thereon, or a computer data signal carrying computer readable program instructions may direct an apparatus to facilitate the practice of the disclosed method. It is understood that such apparatus, articles of manufacture, and computer data signals also come within the scope of the present application.

A "computer readable medium" as used herein means any medium which can store instructions for use by or execution by a computer or other computing device including, but not limited to, a portable computer diskette or hard disk drive (HDD), a random access memory (RAM), a read-only memory (ROM), an erasable programmable-read-only memory (EPROM) or flash memory, an optical disc such as a compact disc (CD) or digital versatile disc (DVD), and a solid state storage device (e.g., NAND flash or synchronous dynamic RAM (SDRAM)).

The various embodiments presented above are merely examples and are in no way meant to limit the scope of this disclosure. Variations of the innovations described herein will be apparent to persons of ordinary skill in the art, such variations being within the intended scope of the present application. In particular, features from one or more of the above-described embodiments may be selected to create alternative embodiments comprised of a sub-combination of features which may not be explicitly described above. In addition, features from one or more of the above-described embodiments may be selected and combined to create alternative embodiments comprised of a combination of features which may not be explicitly described above. Features suitable for such combinations and sub-combinations would be readily apparent to persons skilled in the art upon review of the present application as a whole. The subject matter described herein and in the recited claims intends to cover and embrace all suitable changes in technology.

The invention claimed is:

1. A method of editing calendar information on handheld electronic device comprising a display screen and a touchpad for receiving navigational input in a first and a second direction, the method comprising:
  displaying a calendar event user interface on the display screen, the calendar event user interface comprising a first field and an adjacent second field;
  while in an edit mode, displaying an indicator indicating selection of the first field, and changing a value of the first field in response to receiving at the touchpad a navigational input in a first direction; and
  displaying an indicator indicating selection of the adjacent second field for editing in response to receiving at the touchpad a navigational input in a second direction that is orthogonal to the first direction.

2. The method of claim 1, wherein a selection icon is displayed within the calendar event user interface as the indicator indicating selection of the first field or the second field.

3. The method of claim 2, further comprising:
  terminating the edit mode in response to receiving at the touchpad a predetermined selection input, and displaying the calendar event user interface without any indicator indicating selection of the first field or second field.

4. The method of claim 1, wherein the first direction of navigational input is an up-down direction relative to a front face of the device, and wherein the second direction of navigational input is a left-right direction relative to the front face of the device.

5. The method of claim 1, wherein when the indicator indicating selection of one of the fields is displayed, receiving upward movement on the touchpad relative to a front face of the device increases the value of the selected field and receiving downward movement on the touchpad relative to the front face of the device decreases the value of the selected field, and wherein, when the indicator is displayed in the first field, receiving leftward movement on the touchpad relative to the front face of the device causes display of the indicator indicating selection of the adjacent second field to a left of the first field and receiving rightward movement on the touchpad relative to the front face of the device causes display of an indicator indicating selection of an adjacent third field to a right of the first field.

6. The method of claim 1, wherein the indicator indicating selection of the first field or the second field is a border presented around the first or second field, respectively.

7. The method of claim 6, wherein a fill area within the border has a different colour than a main background colour of the calendar event user interface.

8. The method of claim 7, wherein text within the border has a different text colour than a main text colour of the calendar event user interface.

9. The method of claim 1, wherein the first and second fields each comprise a respective one of the following: a month field, day field, year field, hour field, minute field, and an AM/PM indicator field.

10. The method of claim 9, wherein the first and second fields are presented within a single line within the calendar event user interface.

11. The method of claim 1, wherein the touchpad is a four-way optical sensor.

12. A handheld electronic device, comprising:
   a processor for controlling the operation of the handheld electronic device;
   a display screen connected to the processor;
   a touchpad connected to the processor for receiving navigational input in a first and a second direction;
   a case dimensioned to be held in a hand, the case having a front face and housing the processor, and wherein the touchpad, and display screen are positioned on the front face of the case;
   a memory housed within the case and connected to the processor, the memory having data and instructions stored thereon, the data and instructions configuring the processor to:
      display a calendar event user interface on the display screen, the calendar event user interface comprising a first field and an adjacent second field;
      while in an edit mode, display an indicator indicating selection of the first field, and change a value of the first field in response to receiving at the touchpad a navigational input a first direction; and
      display an indicator indicating selection of the adjacent second field for editing in response to receiving at the touchpad a navigational input in a second direction that is orthogonal to the first direction.

13. The handheld electronic device of claim 12, wherein the processor is configured to display a selection icon as the indicator indicating selection of the first filed or the second field.

14. The handheld electronic device of claim 13, wherein the processor is configured to terminate the edit mode in response to receiving at the touchpad a predetermined selection input, and display the calendar event user interface without any indicator indicating election of the first field or second field.

15. The handheld electronic device of claim 12, wherein the first direction of navigational input is an up-down direction relative to the front face of the case, and wherein the second direction of navigational input is a left-right direction relative to the front face of the case.

16. The handheld electronic device of claim 12, wherein when the indicator indicating selection of one of the fields is displayed, receiving upward movement on the touchpad relative to the front face of the case increases the value of the selected field and receiving downward movement on the touchpad relative to the front face of the case decreases the value of the selected field, and wherein, when the indicator is displayed in the first field, receiving leftward movement on the touchpad relative to the front face of the case causes display of the indicator indicating selection of the adjacent second field to a left of the first field and receiving rightward movement on the touchpad relative to the front face of the case causes display of an indicator indicating selection of an adjacent third field to a right of the first field.

17. The handheld electronic device of claim 12, wherein the indicator indicating selection of the first field or the second field is a border presented around the selected field.

18. The handheld electronic device of claim 17, wherein a fill area within the border has a different colour than a main background colour of the calendar event user interface.

19. The handheld electronic device of claim 12, wherein the first and second fields each comprises a respective one of the following: a month field, day field, year field, hour field, minute field, and an AM/PM indicator field.

20. The handheld electronic device of claim 12 wherein the touchpad is a four-way optical sensor.

21. A computer program product comprising a non-transitory computer readable medium having stored thereon computer program instructions for implementing a method of editing calendar information on a handheld electronic device comprising a display screen and a touchpad for receiving navigational input in a first and a second direction, the computer executable instructions comprising instructions for:
   displaying a calendar event user interface on the display screen, the calendar event user interface comprising a first field and an adjacent second field;
   while in an edit mode, displaying an indicator indicating selection of the first field, and changing a value of the first field in response to receiving at the touchpad a navigational input in a first direction; and
   displaying an indicator indicating selection of the adjacent second field for editing, in response to receiving at the touchpad, a navigational input in a second direction that is orthogonal to the first direction.

* * * * *